US009650231B2

(12) United States Patent
Verheyen

(10) Patent No.: US 9,650,231 B2

(45) Date of Patent: May 16, 2017

(54) METHOD AND APPARATUS FOR CONTROLLING A BUCKET HOIST

(71) Applicant: Magnetek, Inc., Menomonee Falls, WI (US)

(72) Inventor: Kurtis L. Verheyen, Shorewood, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 734 days.

(21) Appl. No.: 13/889,449

(22) Filed: May 8, 2013

(65) Prior Publication Data

US 2014/0333232 A1 Nov. 13, 2014

(51) Int. Cl.

| | |
|---|---|
| ***H02K 7/14*** | (2006.01) |
| ***B66D 1/12*** | (2006.01) |
| ***B66C 13/38*** | (2006.01) |
| ***B66C 13/46*** | (2006.01) |
| *B66C 3/12* | (2006.01) |

(52) U.S. Cl.

CPC .............. *B66C 13/38* (2013.01); *B66C 13/46* (2013.01); *B66C 3/125* (2013.01)

(58) Field of Classification Search

CPC .......... B66C 13/38; B66C 13/46; B66C 3/125

USPC ............................................... 318/5; 254/292

See application file for complete search history.

(56) References Cited

U.S. PATENT DOCUMENTS

| | | | |
|---|---|---|---|
| 778,897 A | 1/1905 | Robb et al. | |
| 1,573,203 A | 2/1926 | Strohacker | |
| 2,920,776 A | 1/1960 | Srnka | |
| 3,199,008 A | 8/1965 | Stone | |
| 3,207,339 A | 9/1965 | Neslin | |
| 4,231,698 A | 11/1980 | Lado | |
| 4,308,489 A | 12/1981 | Bergmann | |
| 4,826,109 A | 5/1989 | Camus | |
| 5,167,401 A * | 12/1992 | James | B66C 13/38 254/292 |
| 5,583,402 A * | 12/1996 | Moisin | H05B 41/3927 315/207 |
| 6,023,862 A | 2/2000 | Sirjola | |
| 6,598,859 B1 * | 7/2003 | Kureck | B66C 13/23 254/292 |
| 6,653,804 B1 | 11/2003 | Kureck | |
| 7,832,126 B2 | 11/2010 | Koellner et al. | |
| 2005/0034902 A1 * | 2/2005 | Madhavarao | G01G 23/3742 177/136 |

(Continued)

*Primary Examiner* — Bentsu Ro

*Assistant Examiner* — Zemenay Truneh

(74) *Attorney, Agent, or Firm* — Boyle Fredrickson, SC

(57) ABSTRACT

A control system for a bucket hoist includes a two-axis master switch configured to generate a first and a second command signal responsive to motion along each axis. Each command signal is provided to one of a pair of motor controllers configured to control one of a pair of motors. The two motors are controlled to raise/lower and open/close the load handling member. When the two-axis master switch is moved to the close position, the closing motor controller is commanded to control its respective motor to begin closing the load handling member. The holding motor controller is configured to generate a current to its respective motor to generate torque at a predefined level. The predefined level of torque is selected such that the load handling member lowers into the material in which it is digging as it is being closed.

14 Claims, 5 Drawing Sheets

(56) References Cited

U.S. PATENT DOCUMENTS

| | | | | |
|---|---|---|---|---|
| 2011/0296721 | A1* | 12/2011 | Ries | E02F 3/48 37/395 |
| 2012/0206074 | A1* | 8/2012 | Kureck | H02P 7/06 318/400.15 |
| 2012/0297819 | A1* | 11/2012 | Becerra | H02P 5/74 62/498 |
| 2013/0302113 | A1* | 11/2013 | Byzewski | G01G 19/18 414/21 |

* cited by examiner

METHOD AND APPARATUS FOR CONTROLLING A BUCKET HOIST

BACKGROUND OF THE INVENTION

The subject matter disclosed herein relates to a system for controlling a bucket hoist. More specifically, a controller generates control signals to a pair of motor controllers which work cooperatively to control operation of the bucket hoist for improved digging operation of the bucket hoist.

As is known to those skilled in the art, a bucket hoist may be used to transfer bulk materials from one location to another. A typical cycle of a bucket hoist begins with a load handling member suspended above the material to be transferred. The load handling member is opened and lowered toward the material to be transferred. When the load handling member reaches the bulk material, it is closed. As the load handling member closes, it digs into the bulk material in order to at least partly fill the load handling member with the bulk material. The load handling member is raised and moved to a new location at which the bulk material is to be dispensed. The new location may be, for example, a conveyor or vehicle by which the material is transported to an industrial process or to another location. The load handling member is opened and the bulk material empties from it.

The load handling member on the bucket hoist is controlled by the rotation of two motors. The load handling member is also referred to as a bucket, a clam-shell, or a grapple, and the motors are sometimes referred to as a closing motor and a holding motor. Each motor causes a sheave to rotate, around which is wound and unwound a rope connected between the sheave and the load handling member. The ropes may also be referred to as the closing rope and the holding rope, corresponding to the closing motor and holding motor, respectively, by which they are controlled. The holding rope is operatively connected either to a fixed point or through a first sheave block located near the top of the load handling member. The closing rope is operatively connected to a second sheave block located below and movable with respect to the fixed point or first sheave block. In order for the load handling member to be raised and/or lowered, each of the motors must operate to raise and/or lower the first and second sheave blocks in tandem. In order for the load handling member to open and/or close, the motors are operated in a differential manner such that the distance between the first and second sheave block varies. As the distance increases, the load handling member opens and as the distance decreases, the load handling member closes.

Historically, bucket hoists have been operated such that the closing motor opens and/or closes the load handling member. The holding motor is held in position either via a brake or via closed loop control of the motor. To open the load handling member, the closing motor runs in a first direction. The second sheave block lowers with respect to the first sheave block, and each half of the load handling member pivots outward about the first sheave block, causing the lower portion of the load handling member to open. To close the load handling member, the closing motor runs in a second direction, opposite from the first direction. The second sheave block raises with respect to the first sheave block, and each half of the load handling member pivots inward about the first sheave block, causing the lower portion of the load handling member to close. The bottom end of each half of the load handling member may include a digging member, such as a blade or teeth configured to engage the bulk material. As the load handling member closes and as each half pivots together, the digging member travels in an arc, digging into the bulk material. When the two halves are fully closed, the bulk material which was scooped by each half is retained within the load handling member.

However, closing the bucket in this manner results in the load handling member being only partial filled. Skilled operators of bucket hoists have learned to run the holding motor to lower the load handling member as the closing motor is run to close the load handling member. The load handling member digs further into the bulk material and results in a greater fill of the load handling member. Nevertheless, such operation is subject to variation by the operator between runs and requires skill to both maximize the fill and alternately, to avoid lowering the load handling member too fat which may result in the load handling member beginning to tip to one side.

Thus, it would be desirable to provide an automated control system to provide a uniform fill of the load handling member between runs with increased efficiency from having a greater fill percentage of the load handling member during each run.

BRIEF DESCRIPTION OF THE INVENTION

The subject matter disclosed herein describes a control system for a bucket hoist which provides a consistent, improved till of the bucket during digging operations. The system includes a two-axis master switch configured to generate a first and a second command signal responsive to motion along each axis. Each command signal is provided to one of a pair of motor controllers, each motor controller configured to control one of a pair of motors which arc, in turn, configured to control the load handling member of the bucket hoist. The two motors are controlled to raise/lower and open/close the load handling member. When the two-axis master switch is moved to the close position, the closing motor controller is commanded to control its respective motor to begin closing the load handling member, and the holding motor controller is configured to generate a current to its respective motor to generate torque at a predefined level. The predefined level of torque is selected such that the load handling member lowers into the material in which it is digging as it is being closed. As a result, the load handling member is filled at a greater percentage and in a manner that is uniform over repeated runs.

According to one embodiment of the present invention, a control system for a hoist having a load handling member controlled by a closing motor and a holding motor includes a two-axis master switch configured to generate a first command signal responsive to motion of the master switch in a first axis and to generate a second command signal responsive to motion of the master switch in a second axis. A first motor controller is configured to rotate the closing motor in either a raising direction or a lowering direction responsive to the first command signal, and the first motor controller includes an output configured to transmit a signal corresponding to the closing motor rotating in the raising direction. A second motor controller includes an input electrically connected to the output of the first motor controller. The second motor controller is configured to rotate the holding motor in either a raising direction or a lowering direction responsive to the second command signal and is further configured to output a current to generate a predefined torque in the holding motor responsive to the signal corresponding to the closing motor rotating in the raising direction received at the input.

According to another aspect of the invention, the second motor controller outputs the current to generate the predefined torque in the holding motor when the signal at the input indicates the closing motor is rotating in the raising direction and the second command signal is not commanding the holding motor to rotate in either the raising direction or the lowering direction. The second motor controller rotates the holding motor in the raising direction when the second command signal is commanding the holding motor to rotate in the raising direction, and the second motor controller rotates the holding motor in the lowering direction when the second command signal is commanding the holding motor to rotate in the lowering direction.

According to yet another aspect of the invention, the second motor controller may include a second input configured to receive a signal from a sensor mounted on the load handling member, where the signal corresponds to the load handling member being closed. The second motor controller may also be configured to stop outputting the current to generate the predefined torque in the holding motor when the signal on the second input indicates the load handling member is closed.

According to another embodiment of the invention, a control system for a hoist having a load handling member controlled by a closing motor and a holding motor includes an operator interface configured to receive a plurality of commands from an operator. in response to the plurality of commands from the operator, the operator interface is configured to generate a first raise signal, a second raise signal, a first lower signal, and a second lower signal. A first motor controller is configured to rotate the closing motor in a first direction responsive to the first raise signal and to rotate the closing motor in a second direction responsive to the first lower signal. A second motor controller is configured to rotate the holding motor in a first direction responsive to the second raise signal, to rotate the holding motor in a second direction responsive to the second lower signal, and to output a torque command to the holding motor responsive to the first raise signal.

According to another aspect of the invention, the second motor controller outputs the torque command to the holding motor responsive to the first raise signal when it is not receiving either the second raise signal or the second lower signal. The second motor controller rotates the holding motor in the first direction when it is receiving the second raise signal, and the second motor controller rotates the holding motor in the second direction when it is receives the second lower signal.

According to yet another aspect of the invention, the second motor controller may be configured to receive the first raise signal. Alternately, the first motor controller may include an output configured to generate a signal corresponding to the first raise signal, and the second motor controller includes an input configured to receive the signal from the first motor controller.

According to still another aspect of the invention, the operator interface may be a two-axis master switch biased to return to a central position at which no command is generated. When the master switch is deflected in a first direction from the central position along a first axis, it generates the first raise signal; and when the master switch is deflected in a second direction, opposite the first direction, from the central position along the first axis, it generates the first lower signal. When the master switch is deflected in a first direction from the central position along a second axis, it generates the second raise signal; and when the master switch is deflected in a second direction, opposite the first direction, from the central position along the second axis, it generates the second lower signal.

The second motor controller may also include an input configured to receive a signal from a sensor mounted on the load handling member. The signal corresponds to the load handling member being closed. The second motor controller is further configured to stop outputting the torque command to the holding motor when the signal on the input indicates the load handling member is closed.

According to still another embodiment of the invention, a method of closing a load handling member from an open position is disclosed. The load handling member is configured to open and close and to raise and lower responsive to rotation of a holding motor and to rotation of a closing motor. The method of closing the load handling member includes the steps of generating a command signal with a master switch, rotating the closing motor via a first motor controller to begin closing the load handling member responsive to the command signal, and supplying a current to the holding motor via a second motor controller responsive to the command signal. The current is regulated such that the holding motor generates a predefined torque at an output shaft of the holding motor.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
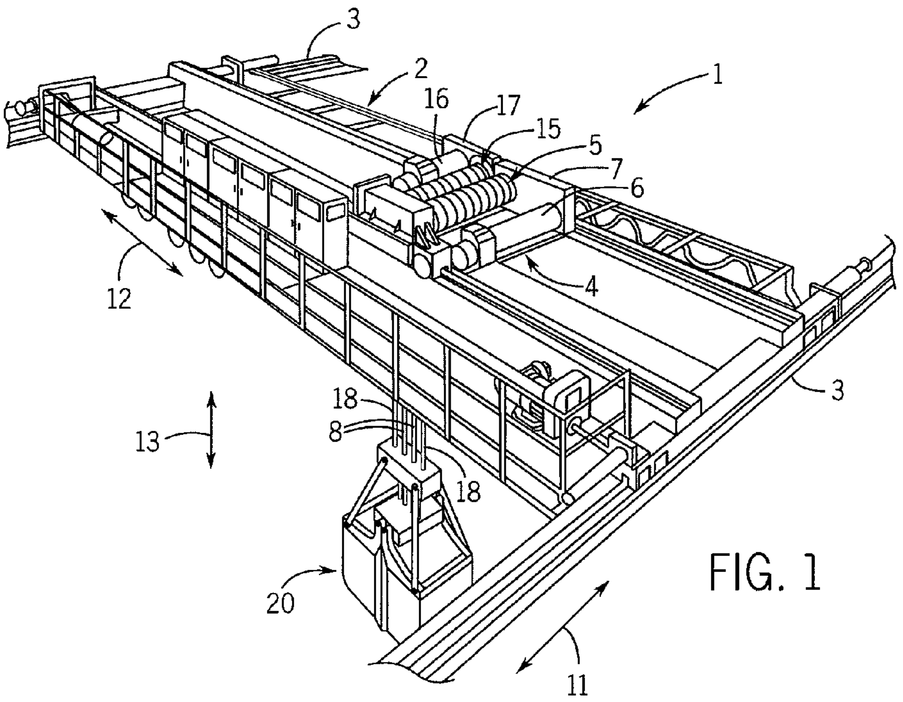
FIG. 1 is an exemplary environment incorporating an exemplary embodiment of the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, an exemplary embodiment of a material handling system 1 incorporating the present invention is illustrated. it is contemplated that the material handling system 1 may have numerous configurations according to the application requirements. According to one embodiment, the material handling system 1 may include a bridge 2 configured to move in a first axis of motion 11 along a pair of rails 3 located at either end of the bridge 2. A trolley 4 may be mounted on the bridge 2 to move in a second axis of motion 12, generally perpendicular to the first axis of motion 11, along the length of the bridge 2. A first sheave 5, also referred to as a drum, is mounted on the trolley 4, around which a first cable 8, also referred to herein as a closing line, is wound. A first motor 6, also referred to herein as a closing motor, is operatively connected to the first sheave 5 via a first gearbox 7. A second sheave 15 is mounted on the trolley 4, around which a second cable 18, also referred to herein as a holding line, is wound. A second motor 16, also referred to herein as a holding motor, is operatively connected to the second sheave 15 via a second gearbox 17. Each of the first and second sheaves 5, 15 may be rotated in either direction to wind or unwind the first and second cables 8, 18 around the respective sheave 5, 15. Each of the first and second cables 8, 18 are connected to a load handling member 20 and configured to cooperatively move the load handling member 20 in a third axis of motion 13, generally perpendicular to each of the first and the second axes of motions, 11 and 12. One or more control cabinets 10 housing, for example, the motor controllers 40, 140 are mounted on the bridge 2.

Figure 6A:
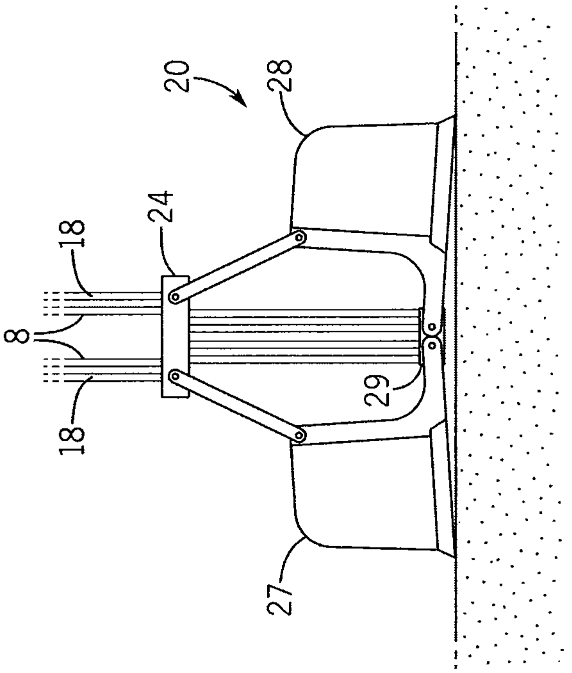
FIG. 6A is an exemplary environmental view illustrating a bucket hoist in an open position resting on material in which the bucket is preparing to dig.
Figure 6B:
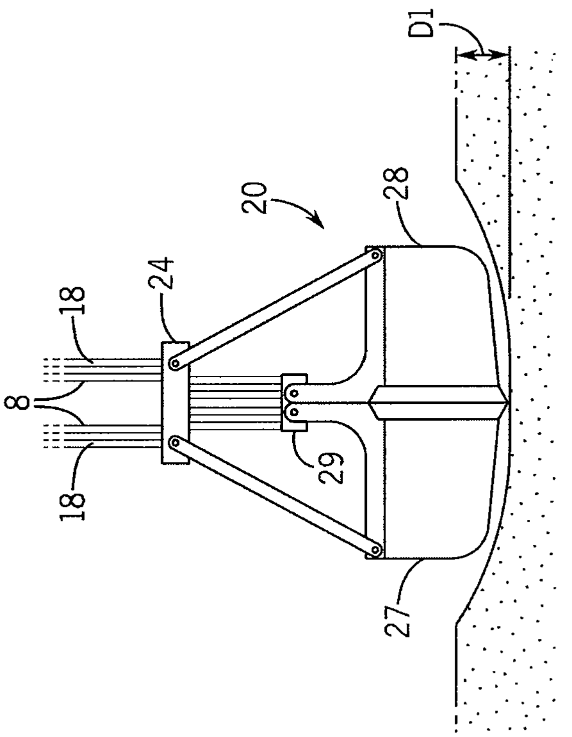
FIG. 6B is an exemplary environmental view illustrating the bucket hoist of FIG. 6A in a closed position after digging into the material from the position shown in FIG. 6A without lowering the bucket in tandem with the closing operation.

Referring also to FIG. 6, each cable 8, 18 is operatively connected to a load handling member 20 having a first half 27 and a second half 28. The load handling member 20, also referred to as a clam-shell or a bucket, further includes a first block 24 and a second block 29 with which the cables 8, 18 are operatively coupled. According to the illustrated embodiment, the first cable 8 passes through the first block 24, extends around a series of pulleys alternating between the second block 29 and the first block 24 and then returns back up through the first block 24. Each end of the first cable 8 is rigidly connected to the first sheave 5. The second cable 18 is connected around pulleys on the first block 24 and is rigidly connected at each end to the second sheave 15. It is contemplated that various roping configurations may be utilized without deviating from the scope of the invention. Each half 27, 28 of the load handling member 20 is pivotally connected to each of the first block 24 and the second block 29.

Figure 2:
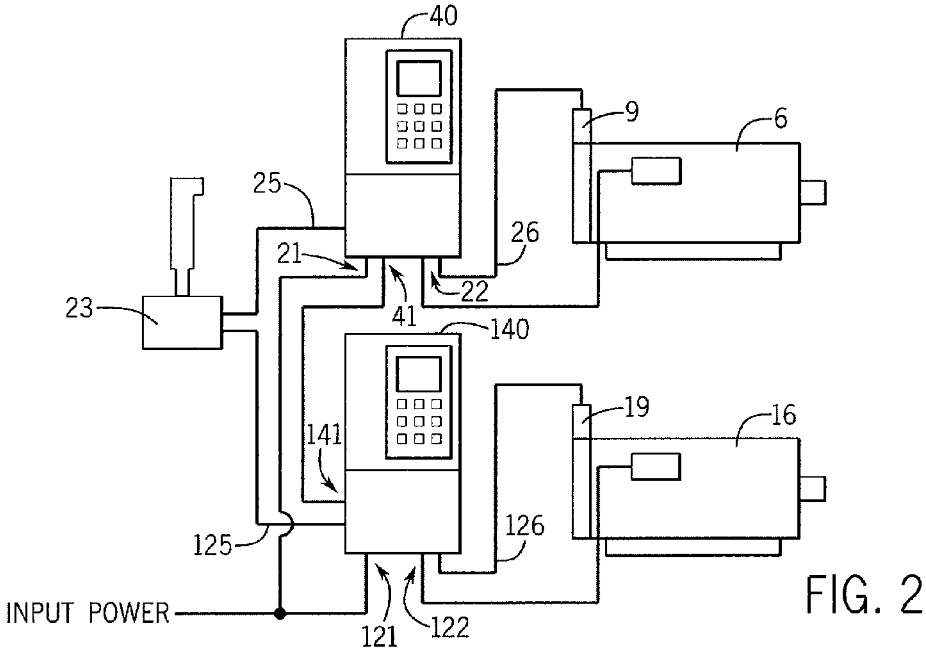
FIG. 2 is partial schematic representation of a control system for the exemplary embodiment of FIG. 1.

Referring next to FIG. 2, an operator interface 23, such as two-axis master switch, is provided for an operator to control operation of the material handling system 1. The operator interface 23 generates a first command signal 25 for a first motor controller 40 and a second command signal 125 for a second motor controller 140. Optionally, a command signal may be generated, for example, as a data message and transmitted to both the first motor controller 40 and the second motor controller 140. Each motor controller 40, 140 includes an input 21, 121 configured to receive input power, which may be a single or multiple phase alternating current (AC) or a direct current (DC) power source. Each motor controller 40, 140 generates an output voltage 22, 122 to the respective motor 6, 16 to achieve desired operation of the motor 6, 16. A position sensor 9, 19, such as an encoder or a resolver, on each motor 6, 16, generates a position feedback signal 26, 126 which is transmitted to the respective motor controller 40, 140.

Figure 3:
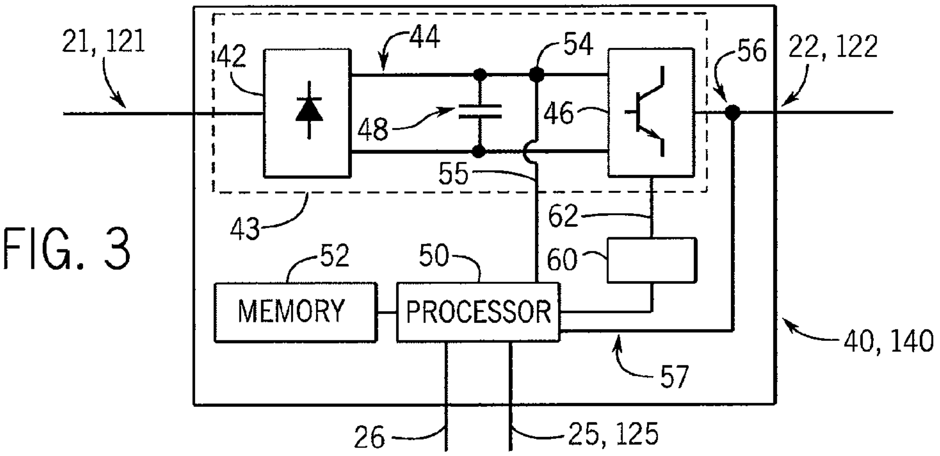
FIG. 3 is a block diagram representation of one of the motor controllers of FIG. 2.

Referring also to FIG. 3, each motor controller 40, 140 includes a power conversion section 43. The power conversion section 43 converts the input power 21, 121 to the desired voltage at the output 22, 122. The desired voltage may be a single or multiple phase AC or a DC output, according to the application requirements. According to the illustrated embodiment, the power conversion section 43 includes a rectifier section 42 and an inverter section 46, converting a fixed AC input to a variable amplitude and variable frequency AC output. Optionally, other configurations of the power conversion section 43 may be included according to the application requirements. The rectifier section 42 is electrically connected to the power input 21, 121. The rectifier section 42 may be either passive, such as a diode bridge, or active, including controlled power electronic devices such as transistors. The AC voltage input 21, 121 is converted to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor controller 40, 140. An inverter section 46 converts the DC voltage on the DC bus 44 to the desired voltage at the output 22, 122 for the motor 6, 16 according to switching signals 62.

The motor controller 40, 140 further includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single or multiple electronic devices, including static memory, dynamic memory, or a combination thereof The memory device 52 preferably stores parameters of the motor controller 40, 140 and one or more programs, which include instructions executable on the processor 50. A parameter table may include an identifier and a value for each of the parameters. The parameters may, for example, configure operation of the motor controller 40, 140 or store data for later use by the motor controller 40, 140.

Figure 4:
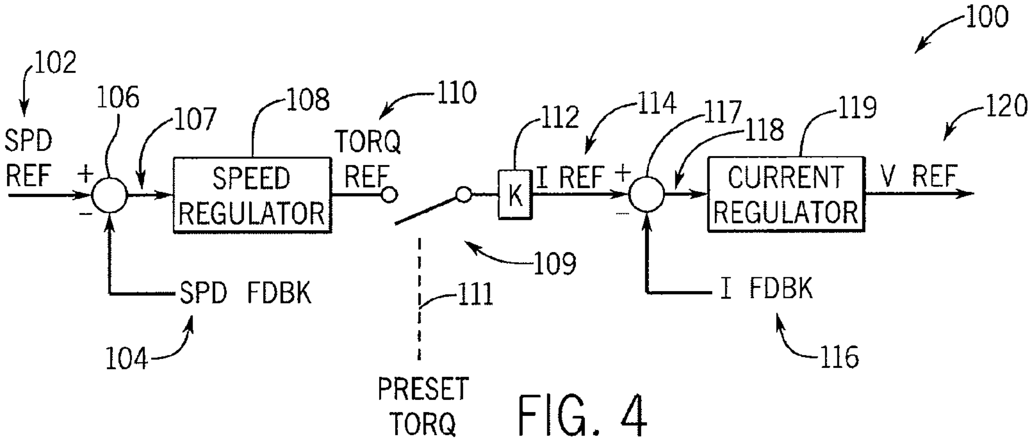
FIG. 4 is block diagram representation of a motor control module executing in the processor of FIG. 3.

Referring also to FIG. 4, the processor 50 is configured to execute a motor control module 100 to generate a voltage reference 120 to the motor 6,16 corresponding to the necessary amplitude and frequency to run the motor 6,16 at the desired speed reference 102. Each motor 6, 16 may include a respective position sensor 9, 19 connected to the motor controller 40, 140 via an electrical connection to provide a position feedback signal 26, 126 corresponding to the angular position of the motor 6, 16. The processor 50 determines a speed feedback signal 104 as a function of the rate of change of the position feedback signal over time.

The processor 50 also receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22, 122 of the motor controller 40, 140 respectively, The switching signals 62 may be determined by an application specific integrated circuit 60 receiving reference signals from a processor 50 or, optionally, directly by the processor 50 executing the stored instructions. The switching signals 62 are generated, for example, as a function of the feedback signals, 55 and 57, received at the processor 50.

The following definitions will be used to describe exemplary material handling systems throughout this specification. As used herein, the terms "raise" and "lower" are intended to denote the operations of letting out or reeling in the cable 8, 18 operatively connected to a load handling member 20 of the material handling system 1 and are not limited to moving a load, L, in a vertical plane. The load handling member 20 may be any suitable device for connecting to or grabbing a load, including, but not limited to, a bucket, a clam-shell, or a grapple. While an overhead crane may lift a load vertically, a winch may pull a load from the side. Further, an appropriately configured load handling member 20 may allow a load to unwind cable or may reel in the load by winding up the cable at any desired angle between a horizontal plane and a vertical plane.

The "cable," also known as a "rope" or a "line", may be of any suitable material. For example, the "cable" may be made from, but is not limited to, steel, nylon, plastic, other metal or synthetic materials, or a combination thereof, and may be in the form of a solid or stranded cable, chain links, or any other combination as is known in the art.

A "run" is one cycle of operation of the motor controller 40, 140. The motor controller 40, 140 controls operation of the respective motor 6, 16 rotating the motor 6, 16 to cause the cable 8, 18 to wind around or unwind from the sheave 5, 15. A "run" may include multiple starts and stops of the motor 6, 16 and, similarly it may require multiple "runs" to let the cable 8, 18 fully unwind or wind completely around the sheave 5, 15. Further, the cable 8, 18 need not be fully unwound from or wound around the sheave 5, 15 before reversing direction of rotation of the motor 6, 16. In addition, direction of rotation of the motor 6, 16 may be reversed within a single run.

Figure 5:
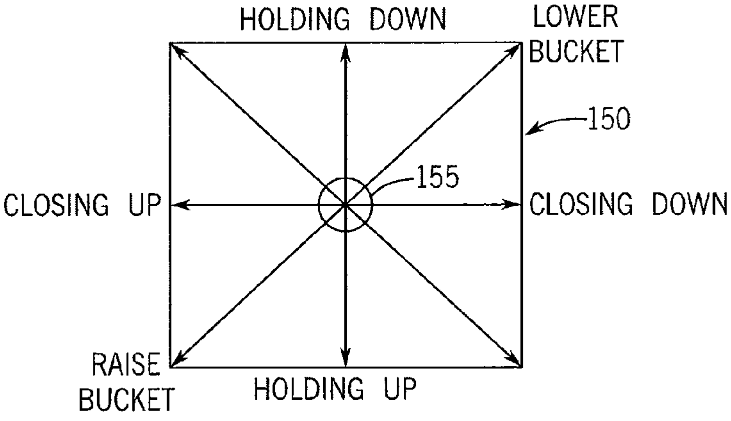
FIG. 5 is a graphical representation of the range of motion of a two-axis switch used by the control system of FIG. 2.

In operation, the load handling member 20 is controlled via an operator interface 23. According to the illustrated embodiment, a two-axis master switch is provided as the operator interface 23. The two-axis master switch 23 permits an operator to control both motors 6, 16 with a single controller. It is contemplated that various other operator interfaces may be provided without deviating from the scope of the present invention. Referring to FIG. 5, the handle of the two-axis master switch 23 may be positioned at any point within the limits of travel of each axis as defined by the outer box 150. The master switch 23 is preferably, biased to return to a central position 155 wherein there is no commanded motion to either motor 6, 16. This central position 155 provides a default, or resting position in which no motion is commanded on the load handling member 20.

Motion to each axis is commanded by moving the handle of the master switch 23 away from the central position 155. According to one embodiment of the invention, each axis generates an analog signal, for example, between zero and ten volts, where zero volts is full deflection in one direction, five volts is the central position 155 and ten volts is full deflection in the opposite direction. Optionally, other voltage ranges or a differential voltage with a negative to positive voltage range may he used. As the handle of the master switch 23 is deflected further from the central position 155, the rate at which the motor 6, 16 rotates increases. Deflection to the left causes the closing motor to run in the raise direction. With reference also to FIG. 6, the closing motor "raising" causes the second block 29 to move closer to the first block 24, closing the load handling member 20. Deflection to the right causes the closing motor to run in the lower direction. The closing motor "lowering" causes the second block 29 to move away from the first block 24, opening the load handling member 20. Deflection toward the bottom causes the holding motor to run in the raise direction. The holding motor "raising" causes the first block 24 to move away from the second block 29. Absent a command to the closing motor, raising the holding motor will also open the load handling member 20. Thus, the master switch 23 is moved to the lower left corner, providing raising commands to both the holding motor and the closing motor in order to raise the load handling member 20. Deflection toward the top causes the holding motor to run in the lower direction. The holding motor "lowering" causes the first block 24 to move toward the second block 29. Absent a command to the closing motor, lowering the holding motor will also close the load handling member 20. Thus, the master switch 23 is moved to the upper right corner, providing lowering commands to both the holding motor and the closing motor in under to lower the load handling member 20.

Referring again to FIGS. 2-3, the processor 50 for each motor controller 40, 140 receives the respective command signal 25, 125 from the master switch indicating the desired operation of the corresponding motor 6, 16. It is contemplated, that the command signal 25, 125 may correspond to a desired speed of rotation for the respective motor 6, 16 or a desired torque to be output by the respective motor 6, 16. If the command signal 25, 125 corresponds to a desired speed of rotation, the command signal 25, 125 is received by the processor 50 and converted, for example, from the analog signal to an appropriately sealed speed reference 102 for use by the motor control module 100, as shown in FIG. 4. Further, if closed loop speed control of the motor controller 40 is desired, a speed feedback signal 104 is provided to the motor control module 100. The speed feedback signal 104 may be derived from a position feedback signal generated by the position sensor 9, 19. Optionally, the speed feedback signal 104 may be derived from an internally determined position signal generated, for example, by a position observer. The speed reference 102 and the speed feedback signal 104 enter a summing junction 106, resulting in a speed error signal 107. The speed error signal 107 is provided as an input to a speed regulator 108. The speed regulator 108, in turn, determines the torque reference 110 required to minimize the speed error signal 107, thereby causing the motor 6, 16 to run at the desired speed reference 102. If open loop speed control of the motor controller 40 is desired, no speed feedback signal 104 is present. The speed reference signal 102 may instead be scaled directly to a torque reference 110 that would result in the motor 6, 16 operating at the desired speed reference 102. If the command signal 25, 125 corresponds to a desired torque to be output by the respective motor, the processor 50 may directly convert the command signal 25, 125 to the torque reference 110 using, for example, a constant scaling factor stored in a parameter of the memory device 52.

A scaling factor 112 converts the torque reference 110 to a desired current reference 114. The current reference 114 and a current feedback signal 116, derived from a feedback signal 57 measuring the current present at the output 22, 122 of each motor controller 40, 140 each enter a second summing junction 117, resulting in a current error signal 118. The current error signal 118 is provided as an input to the current regulator 119. The current regulator 119 generates the voltage reference 120 which will minimize the error signal 118, again causing each motor 6, 16 to run at the desired speed reference 102. This voltage reference 120 is used to generate the switching signals 62 which control the inverter section 46 to produce a variable amplitude and frequency output voltage 22, 122 to the motor 6, 16.

According to one aspect of the invention, the close command (e.g., deflection of the handle of the master switch 23 to the left) is also provided to the holding motor controller 140. The holding motor controller 140 utilizes the closing command to improve the digging performance of the load handling member 20. It is contemplated that the close command may be provided directly to the holding motor controller 140 from the master switch 23. For example, a second input may be configured on the holding motor controller 140 to receive the command signal 25 for the closing motor controller 40. Optionally, if each of the command signals 25, 125 are transmitted as a data packet via an industrial network, the holding motor controller 140 may identify both command signals 25, 125. According to yet another embodiment of the invention, an output 41 on the closing motor controller 40 is configured to generate a signal corresponding to operating the closing motor 6 in a raising direction, and an input 141 on the holding motor controller 140 is configured to receive the signal from the closing motor controller 40.

Figure 8:
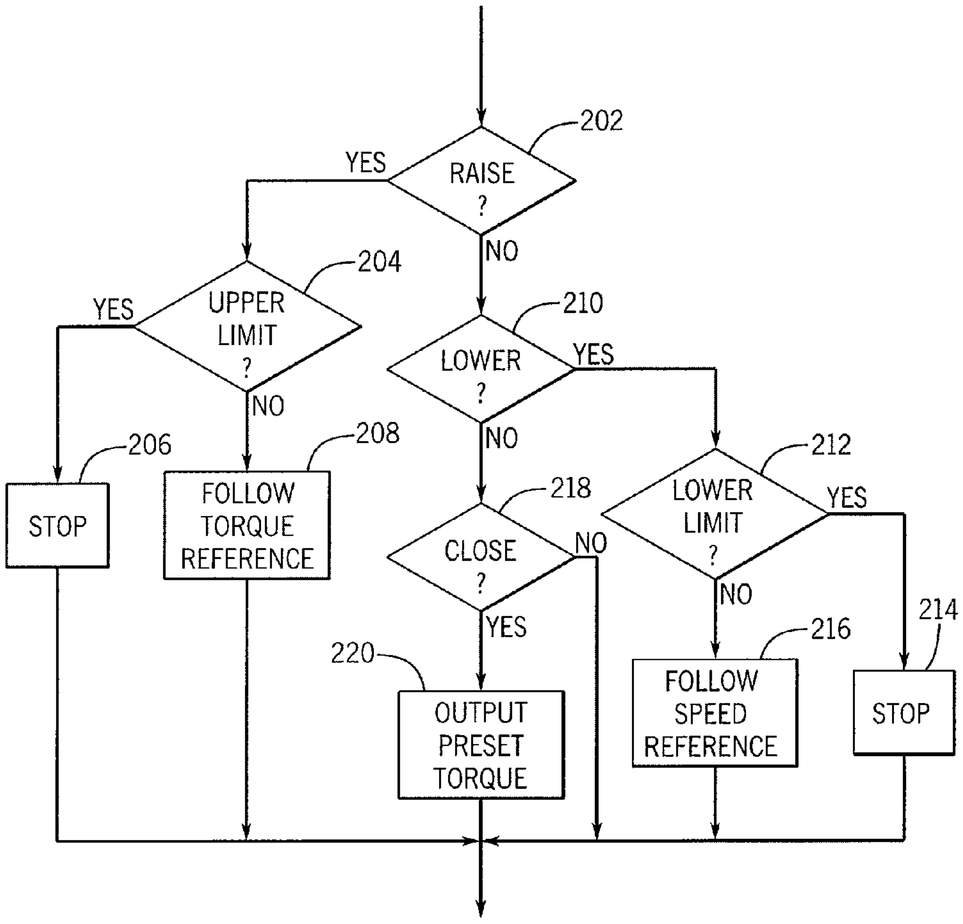
FIG. 8 is a flowchart illustrating selection of the operating modes of the holding motor controller.

Referring next to FIG. 8, operation of the holding motor controller 140 in response to both command signals 25, 125 is illustrated. At step 202, the holding motor controller 140 checks whether command signal 125 indicates the holding motor 16 should operate in the raise direction. If the holding motor controller 140 is commanded to operate the holding motor 16 in the raise direction and if the material handling system 1 includes a limit switch generating a signal corresponding to the upper limit of travel of the load handling member 20, the holding motor controller 140 checks an input corresponding to the upper limit at step 204. If the load handling member 20 has reached the upper limit, the holding motor controller 140 stops commanding operation of the holding motor 16, as shown in step 206, but if the load handling member 20 has not reached the upper limit, the holding motor controller 140 commands operation of the holding motor 16. According to the illustrated embodiment, the holding motor 16 follows a torque reference 110 from the holding motor controller 140 in the raise direction, as shown in step 208. Optionally, a speed reference 102 may be provided in response to the raise command.

If the holding motor controller 140 is not commanded to operate in the raise direction, the holding motor controller 140 checks whether the command signal 125 indicates the holding motor 16 should operate in the lower direction, as illustrated in step 210. If the holding motor controller 140 is commanded to operate the holding motor 16 in the lower direction and if the material handling system 1 includes a limit switch generating a signal corresponding to the lower limit of travel of the load handling member 20, the holding motor controller 140 checks an input corresponding to the lower limit at step 212. If the load handling member 20 has reached the lower limit, the holding motor controller 140 stops commanding operation of the holding motor 16, as shown in step 214, but if the load handling member 20 has not reached the lower limit, the holding motor controller 140 commands operation of the holding motor 16. According to the illustrated embodiment, the holding motor 16 follows a speed reference 102 from the holding motor controller 140 in the lower direction, as shown in step 216. Optionally, a torque reference 110 may be provided in response to the lower command.

If the holding motor controller 140 is not commanded by the command signal 125 to operate in either the raise or lower direction, the holding motor controller 140 checks whether the command signal 25 for the closing motor controller 40 indicates the closing motor 6 should operate in the raise direction to close the load handling member 20, as illustrated in step 218. If the command signal 25 for the closing motor controller 40 does not indicate that the closing motor 6 is closing the load handling member 20, the holding motor controller 140 provides no command to the holding motor 16. If the command signal 25 for the closing motor controller 40 commands the closing motor 6 to dose the load handling member 20 and no command signal 125 is provided for the holding motor controller 140, the holding motor controller 140 commands the holding motor 16 to operate at a preset torque reference 111, as shown in step 220.

The preset torque reference 111 is selected to improve the digging operation of the load handling member 20. Referring to FIGS. 6 and 7, comparison of the load handling member 20 while the holding motor controller 140 commands the holding motor 16 to operate with (FIG. 7) and without (FIG. 6) the preset torque reference 111 is illustrated. Referring first to FIG. 6, if no command is provided to the holding motor 16 and the closing motor 6 is commanded to close the load handling member 20, the first block 24 remains at substantially the same location with respect to the material in which the load handling member 20 is digging. Each half 27, 28 of the load handling member 20 pivots with respect to the first and second blocks 24, 29 following an arcuate path shown in FIG. **6*b* and digging into the material to a first depth, $D_1$. However, digging according this method results in a partially filled load handling member 20**.

If no brake is applied to the holding motor 16 and the holding motor controller 140 is not commanded to run, the weight of the load handling member 20 is acted upon by gravity causing the load handling member 20 to begin drifting downwards. Similarly, the weight of the holding ropes 18 are acted upon by gravity. With no counter force applied either from a brake or from the holding motor controller 140, the forces applied to the holding sheave 15 due to the weight of the load handling member 20 and the holding ropes 18 may be sufficient to cause the holding sheave 15 and, consequently, the holding motor 16 to begin rotating such that the holding ropes 18 unwind from the holding sheave 15 lowering the first block 24 and the load handling member 20. Allowing the holding ropes 18 to unwind in an uncontrolled manner may result in excessive rope 18 being unwound and undesirable slack in the holding rope 18 may result. Consequently, a preset torque may be selected having a sufficient magnitude to maintain tension on the holding ropes 18 yet low enough that the weight of the load handling member 20 still causes the load handling member 20 to drift downward.

Figure 7B:
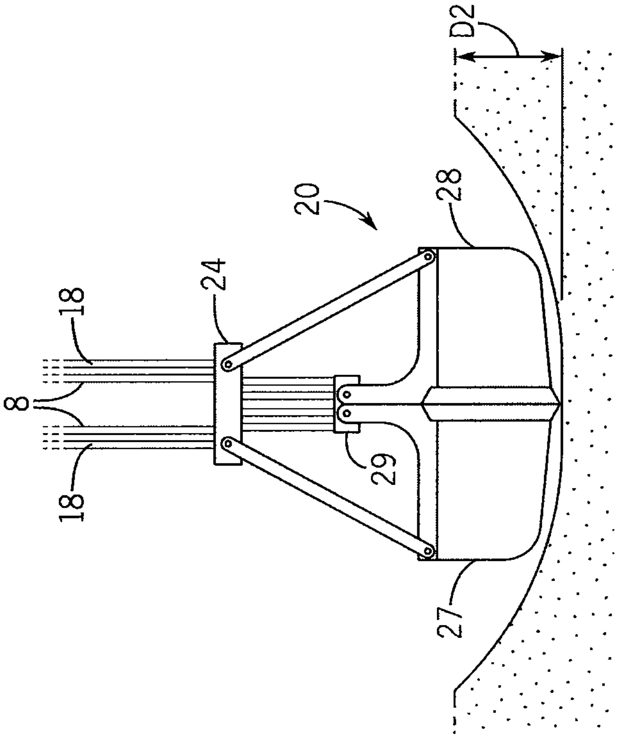
FIG. 7B is an exemplary environmental view illustrating the bucket hoist of FIG. 7A in a closed position after digging into the material from the position shown in FIG. 7A while lowering the bucket in tandem with the closing operation.
Figure 7A:
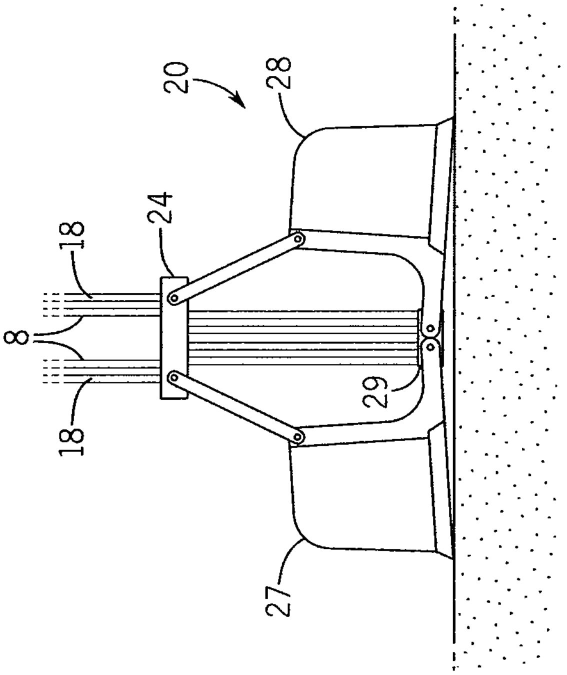
FIG. 7A is an exemplary environmental view illustrating a bucket hoist in an open position resting on material in which the bucket is preparing to dig.

Referring next to FIG. 7, the closing command 25 is provided to the holding motor controller 140. When the closing motor controller 40 is commanding the closing motor 6 to close the load handling member 20, a signal is generated at an output 41 and transmitted to an input 141 at the holding motor controller 140. The holding motor controller 140, in turn, commands the holding motor 16 to generate torque at a preset value 111. According to one embodiment of the invention, this preset value is set to about 25% of the rated torque for the holding motor 16 and more preferably, is set to about 10% of the rated torque for the holding motor 16. The holding motor controller 140 commands the holding motor 16 to operate at this preset torque level allowing the load handling member 20 and, consequently, the first block 24 to move downward as the load handling member 20 closes. The resulting digging operation generates the arcuate path shown in FIG. 7*b*, digging into the material to a second depth, $D_2$, where the second depth is greater than the first depth, $D_1$. As a result, the load handling member 20 is filled to a greater percentage of its capacity than digging with the holding motor 16 held still.

Referring again to FIG. 4, the preset torque 111 may be provided directly to the motor control module 100 via a switch 109. The switch 109 may be implemented, for example, as a conditionally executed set of program instructions. The preset torque value 111 is then used to generate the voltage reference 120 as discussed above. The switch is controlled according to the command signals 25, 125 provided to the holding motor controller 140. According to one embodiment of the invention, the switch 109 is connected to the torque reference 110 output from the speed regulator 108 or generated by the holding motor controller 140 if a holding motor command 125 is present. lithe holding motor command 125 is not present and the closing motor command 25 is present, the switch 109 is connected to the preset torque value 111.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the hest modes known for practicing the invention and will enable others skilled in the art to utilize the invention.

I claim:

1. A control system for a hoist having a load handling member controlled by a closing motor and a holding motor, the control system comprising:

a two-axis master switch configured to generate a first command signal responsive to motion of the master switch in a first axis and to generate a second command signal responsive to motion of the master switch in a second axis;

a first motor controller configured to rotate the closing motor in one of a raising direction and a lowering direction responsive to the first command signal from the two-axis master switch, wherein the first motor controller includes an output configured to transmit a signal corresponding to the closing motor rotating in the raising direction;

a second motor controller including an input electrically connected to the output of the first motor controller; and a close signal provided to the second motor controller, wherein the close signal indicates the load handling member is closed and wherein the second motor controller is configured to:

rotate the holding motor in one of a raising direction and a lowering direction responsive to the second command signal from the two-axis master switch, output a current to generate a predefined torque in the holding motor responsive to the signal corresponding to the closing motor rotating in the raising direction received at the input, and stop outputting the current to generate the predefined torque in the holding motor when the close signal indicates the load handling member is closed.

2. The control system of claim 1 wherein:

the second motor controller outputs the current to generate the predefined torque in the holding motor when the signal at the input indicates the closing motor is rotating in the raising direction and the second command signal is not commanding the holding motor to rotate in either the raising direction or the lowering direction, the second motor controller rotates the holding motor in the raising direction when the second command signal is commanding the holding motor to rotate in the raising direction, and the second motor controller rotates the holding motor in the lowering direction when the second command signal is commanding the holding motor to rotate in the lowering direction.

3. The control system of claim 1 wherein the second motor controller includes a second input configured to receive a signal from a sensor mounted on the load handling member, wherein the close signal provided to the second motor controller is the signal from the sensor mounted on the load handling member.

4. A control system for a hoist having a load handling member having a first block and a second block, wherein relative motion between the first block and the second block causes the load handling member to open or close and wherein motion by both the first block and the second block in the same direction causes the load handling member to raise or lower, the control system comprising:

an operator interface configured to receive a plurality of commands from an operator and, in response to the plurality of commands from the operator, configured to generate a first raise signal, a second raise signal, a first lower signal, and a second lower signal, wherein:

the first raise signal commands a closing motor operatively connected to the second block on the load handling member to rotate in a first direction, the second raise signal commands a holding motor operatively connected to the first block on the load handling member to rotate in the first direction, the first lower signal commands the closing motor operatively connected to the second block on the load handling member to rotate in a second direction, and the second lower signal commands the holding motor operatively connected to the first block on the load handling member to rotate in the second direction;

a first motor controller in communication with the operator interface to receive the first raise signal and the first lower signal, the first motor controller configured to rotate the closing motor in the first direction responsive to the first raise signal and to rotate the closing motor in the second direction responsive to the first lower signal; and a second motor controller in communication with the operator interface to receive the second raise signal and the second lower signal, the second motor controller configured to rotate the holding motor in a first direction responsive to the second raise signal, and to rotate the holding motor in a second direction responsive to the second lower signal, wherein the second motor controller is further operative to output a torque command to the holding motor responsive to the first raise signal.

5. The control system of claim 4 wherein:

the second motor controller outputs the torque command to the holding motor responsive to the first raise signal when it is not receiving either the second raise signal or the second lower signal, the second motor controller rotates the holding motor in the first direction when it is receiving the second raise signal, and the second motor controller rotates the holding motor in the second direction when it is receives the second lower signal.

6. The control system of claim 4 wherein the second motor controller is configured to receive the first raise signal.

7. The control system of claim 4 wherein the first motor controller includes an output configured to generate a signal corresponding to the first raise signal and wherein the second motor controller includes an input configured to receive the signal from the first motor controller.

8. The control system of claim 4 wherein the operator interface is a two-axis master switch biased to return to a central position at which no command is generated and wherein:

the master switch is deflected in a first direction from the central position along a first axis to generate the first raise signal and is deflected in a second direction, opposite the first direction, from the central position along the first axis to generate the first lower signal, and the master switch is deflected in a first direction from the central position along a second axis to generate the second raise signal and is deflected in a second direction, opposite the first direction, from the central position along the second axis to generate the second lower signal.

9. The control system of claim 5 wherein the second motor controller includes an input configured to receive a signal from a sensor mounted on the load handling member, wherein the signal corresponds to the load handling member being closed.

10. The control system of claim 9 wherein the second motor controller is further configured to stop outputting the torque command to the holding motor when the signal on the input indicates the load handling member is closed.

11. A method of closing a load handling member from an open position, wherein the load handling member includes a first block and a second block and relative motion between the first block and second block causes the load handling member to open and close and wherein motion by both the first block and the second block in the same direction causes the load handling member to raise and lower, the method comprising the steps of:

generating a command signal with a master switch, wherein the command signal is operative to cause the load handling member to close;

rotating a closing motor via a first motor controller to bring the second block closer to the first block, thereby closing the load handling member responsive to the command signal; and supplying a current to a holding motor via a second motor controller responsive to the command signal, wherein the current is regulated such that the holding motor generates a predefined torque at an output shaft of the holding motor and the predefined torque is less than a magnitude of torque required to suspend a weight of the load handling member.

12. The method of claim 11 further comprising the step of transmitting the command signal from the master switch to the first motor controller, wherein the first motor controller begins closing the load handling member upon receiving the command signal.

13. The method of claim 12 further comprising the step of transmitting the command signal from the master switch to the second motor controller, wherein the second motor controller begins supplying the current to the holding motor upon receiving the command signal.

14. The method of claim 12 further comprising the steps of generating an output signal with the first motor controller corresponding to closing the load handling member; and transmitting the output signal from the first motor controller to the second motor controller, wherein the second motor controller begins supplying the current to the holding motor upon receiving the output signal from the first motor controller.

* * * * *